United States Patent [19]
Komine

[11] 3,940,777
[45] Feb. 24, 1976

[54] CASING OF A MECHANICAL MOUNTING FOR THE INTERCHANGEABLE LENSES AND A CAMERA SYSTEM USING THE SAME

[75] Inventor: Yoshio Komine, Tokyo, Japan
[73] Assignee: Canon Kabushiki Kaisha, Japan
[22] Filed: Aug. 21, 1974
[21] Appl. No.: 499,161

[30] Foreign Application Priority Data
Aug. 27, 1973  Japan.............................. 48-100412

[52] U.S. Cl................................. 354/197; 352/140
[51] Int. Cl.².................... G03B 3/00; G03B 13/02
[58] Field of Search....... 354/195, 197, 25; 352/140

[56] References Cited
UNITED STATES PATENTS
3,656,422  4/1972  Hess et al. ...................... 354/195 X Primary Examiner—Richard A. Wintercorn
Attorney, Agent, or Firm—Toren, McGeady and Stanger

[57] ABSTRACT

A stationary casing of a mechanical mounting for interchangeable lenses which are to be used with a motion picture or still camera is provided with first connecting terminals for electric connection arranged in a space within a coupling adapted to mate with a coupling of the camera housing. Second connecting terminals are also provided for electric connection arranged in a space within a coupling adapted to mate with a coupling of an interchangeable attachment unit. The first and second connecting terminals being electrically connected to each other through respective insulated wires provided in the stationary casing. Such a casing structure permits selection of interchangeable attachment units such as those incorporating a zoom-drive mechanism, an automatic focus-adjusting mechanism and an automatic diaphragm drive mechanism for use with the mechanical mounting. The attachment unit mounted on the casing in connection with the second connecting terminals is caused to operate in response to output signals from the electric power source and control apparatus incorporated in the camera housing.

27 Claims, 5 Drawing Figures

CASING OF A MECHANICAL MOUNTING FOR THE INTERCHANGEABLE LENSES AND A CAMERA SYSTEM USING THE SAME

BACKGROUND OF THE INVENTION

1. Field of the Invention

This invention relates to casings of mechanical mountings for interchangeable lenses for use with motion picture and still cameras, and a camera system using the same.

2. Description of the Prior Art

With recent advances in electronification of camera mechanisms the field of still cameras adapted for use with interchangeable lenses has already developed a system in which a diaphragm device is incorporated as a unit in a mechanical mounting for the interchangeable lenses, and the diaphragm information representative of the aperture size of the controlled diaphragm device is electrically transmitted through a suitable electrical intermediary to the camera housing wherein it is presented to the camera operator. Also in the field of motion picture cameras adapted for use with interchangeable lenses, there has been divised a system in which a motor either for driving an EE diaphragm device, or for driving a zoom-operating means is associated as a unit with a mounting mechanism for interchangeable lenses, and the terminals of the motor are connected through an electrical intermediary to an exposure control circuit and a power source provided in the camera housing. In this manner, the motor is operated in response to signals or electric power supply from the camera housing.

Such conventional systems, however, are realized in mechanical mountings for interchangeable lenses in such ways as not to permit selection of drive mechanisms for demountably mounting in the mechanical mounting. For example, a mechanical mounting which is designed for association with an EE diaphragm drive mechanism connot be operated with other than the EE diaphragm drive mechanism incorporated therein in unison, while a mechanical mounting which is designed for association with a zoom drive mechanism connot be operated with other than the zoom drive mechanism incorporated therein in unison. Therefore, the cost of production of a lens unit employing such a combination of mounting and driving mechanism for an interchangeable lens system is considerably raised. Further, in several photography applications requiring production of different photographic effects by the use of different interchangeable lenses, there must be provided a series of lens units incorporating respective mechanisms adapted for use in different photography applications. This creates problems such that the cost necessary for acquiring the series of lens units by large, and the handling of the lens units when carrying with and when interchanging them is very troublesome.

Summary of the Invention

An object of the present invention is to provide a casing of a mechanical mounting for interchangeable lenses which has overcome the above-mentioned drawbacks.

Another object of the present invention is to provide a casing of a mechanical mounting for the interchangeable lenses which permits selection of interchangeable attachment units for association with the mechanical mounting to control the operation of the mechanical mounting.

Still another object of the present invention is to provide a casing of a mechanical mounting for the interchangeable lenses which casing is provided with electric connecting means for receiving information or electric power supply from the camera housing, and further with electric connecting means for transmitting the received information or electric power supply to an interchangeable attachment unit mounted thereon.

A further object of the present invention is to provide a camera system which permits selection of interchangeable attachment units for association with a mechanical mounting for interchangeable lens system, and which does not require any additional electric power source to be particularly provided in the attachment unit for driving the mechanical mounting for the interchangeable lens system.

Other objects and features of the present invention will become apparent from the following description taken in conjunction with the accompanying drawings.

DESCRIPTION OF THE PREFERRED EMBODIMENT

Figure 1:
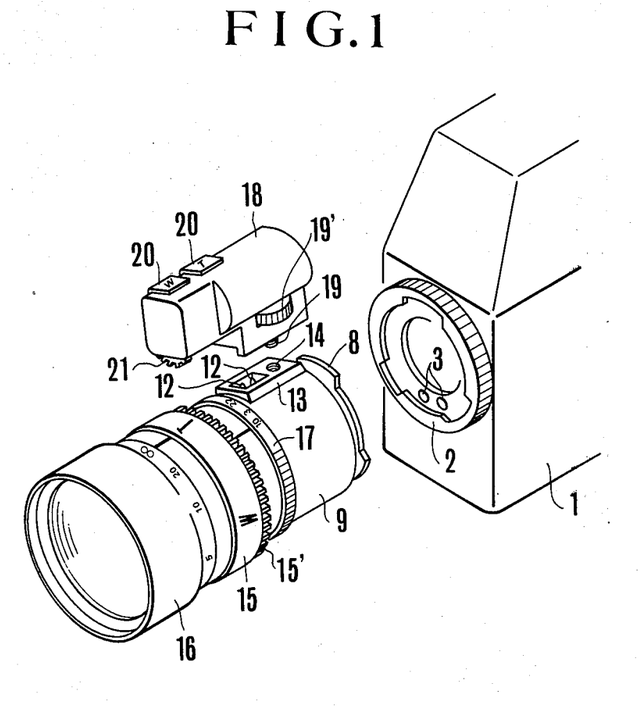
FIG. 1 is a perspective view of a first camera system employing a casing of a mechanical mounting for interchangeable lenses according to an embodiment of the present invention.
Figure 2:
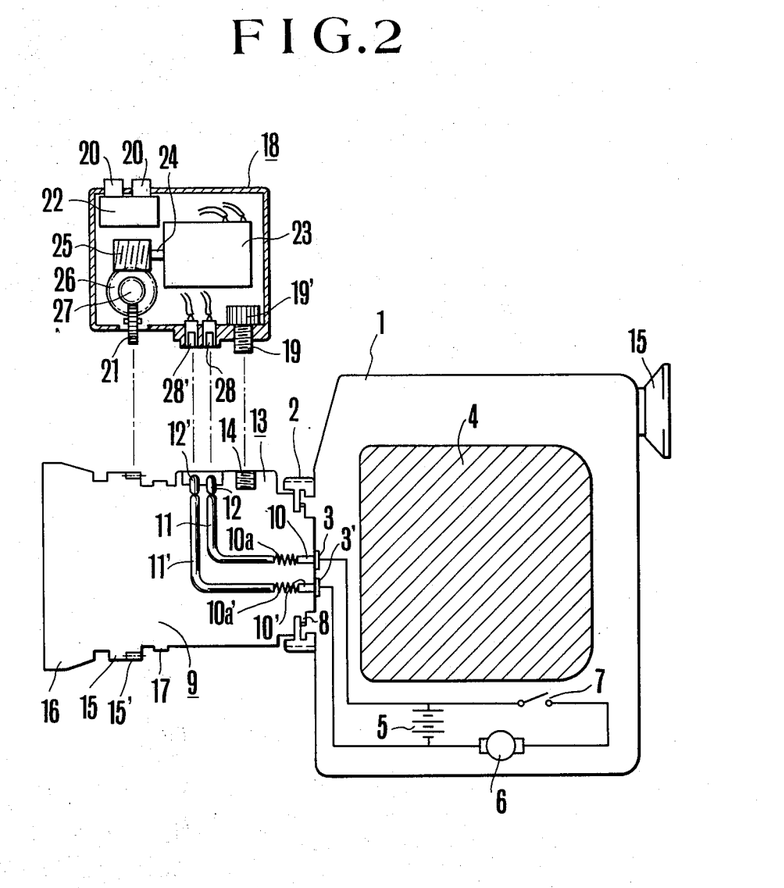
FIG. 2 is a schematic partly sectional partly elevational view of interchangeable lens mount casing of FIG. 1 mounted on the camera housing, and an interchangeable attachment unit which is illustrated as being about to be mounted on the casing.

Referring to FIGS. 1 and 2, one embodiment of a camera system according to the present invention is illustrated as comprising a motion picture camera housing 1, an interchangeable zoom lens unit 9, and an interchangeable attachment unit 18 incorporating therein a zoom drive mechanism for driving a mechanical mounting for the zoom lens in the lens unit 9. The camera housing 1 is provided with a lens unit-coupling 2, a pair of connecting terminals 3 and 3' for electric connection to the lens unit 9, a magazine chamber which removably accommodates a film magazine 4, a battery 5 as an electric power source, a motor 6 associated with the camera mechanism including a shutter mechanism and a film transport mechanism for advancing the film in the film magazine 4 intermittantly past an exposure aperture not shown, a release switch 7 which is accessible to the operator from the outside of the camera housing 1, and an eyepiece 29 provided in a view finder not shown. The connecting terminals 3 and 3' are arranged in a space within the lens unit-coupling 2 of the camera housing 1, and are electrically connected to the battery 5. The lens unit 9 comprises a stationary casing of a mechanical mounting for the zoom lens, the stationary casing being provided with a coupling 8 adapted to mate with the lens unit-coupling 2 of the camera housing 1 so that the lens unit 9 is sellectively mountable on the camera housing in their mating couplings 2 and 8 in bayonet-coupling relation and is selectively demountable therefrom, and fixedly mounted on the rear end of the stationary casing so that when the lens unit 9 is mounted on the camera housing 1 at their mating couplings 2 and 8, an optical axis of the zoom lens in the lens unit 9 is brought into alignment with an exposure aperture in the camera housing 1. Arranged in a space within the coupling 8 is a pair of connecting terminals 10 and 10' for electric connection to the camera housing 1 which terminals are brought into electric contact with the respective camera housing side connecting terminals 3 and 3' in 3-to-10 and 3'-to-10' relations when the lens unit 9 is mounted on the camera housing 1. The stationary casing is further provided with an attachment unit-coupling 13 arranged on a portion of the outer peripheral surface thereof so that an interchangeable attachment unit is selectively mountable on and demountable from the casing. Arranged in a space within the attachment unit-coupling 13 is a pair of connecting terminals 12 and 12' for electric connection to the attachment unit 18 which terminals are connected to the terminals 10 and 10' through respective insulated wires 11 and 11' so that an electric power supply from the battery 5 is transmitted through the connecting terminals 3, 3', 10 and 10' and the insulated wires 11 and 11' to the connecting terminals 12 and 12'. In order to insure that the lens unit side connecting terminals 10 and 10' remain in sufficient electric contact with the camera side connecting terminals 3 and 3' while the lens unit 9 is mounted on the camera housing 1, there are provided pressor helical sprins 10a and 10a' mounted behind the respective connecting terminals 10 and 10'. In order to rigidly secure the attachment unit 18 to the coupling 13, there is provided a fastener assembly comprising a screw-threaded hole 14 provided in the coupling 13, a screw fastener 19 adapted for engagement with the hole 14 and having a control knob 19' coaxially mounted on one end of the screw fastener 19, the fastener assembly being arranged between the attachment unit 18 and the coupling 13 so that after the unit 18 is seated on the coupling 13, the control knob 19 is rotated in a certain direction causing the screw fastener 19 to enter the hole 14 while meshing therewith to rigidly secure the unit 18 to the lens unit 9. For demounting the unit 18 from the lens unit 9, the operator needs only to rotate the control knob 19 in the direction opposite to the above until the screw fastener 19 is disengaged from the hole 14. The unit 18 is provided with zoom control buttons 20, a switch assembly 22 which is operated with the zoom control buttons 20, a drive motor 23, a gear arrangement for transmitting the motion of the motor 23 to the zoom control ring 15 comprising a worm 25 coaxially affixed to the drive shaft 24 of the motor 23, a worm wheel 26 engaging the worm 25, a worm 27 coaxially affixed to the worm wheel 26, and a worm wheel 21 engaging the worm 27. The worm wheel 21 is a arranged to engage the gear 15 fixedly carried on the zoom control ring 15 when the unit 18 is mounted on the lens unit 9 at the coupling 13. The unit 18 is further provided with a pair of connecting terminals 28 and 28' for electric connection to the lens unit 9 arranged so that when the unit 18 is mounted on the lens unit 9 at the coupling 13, they are brought into engagement with the lens unit side connecting terminals 12 and 12' to transmit an electric power supply from the battery 5 in the camera housing 1 to the drive motor 23 in the attachment unit 18.

Figure 3:
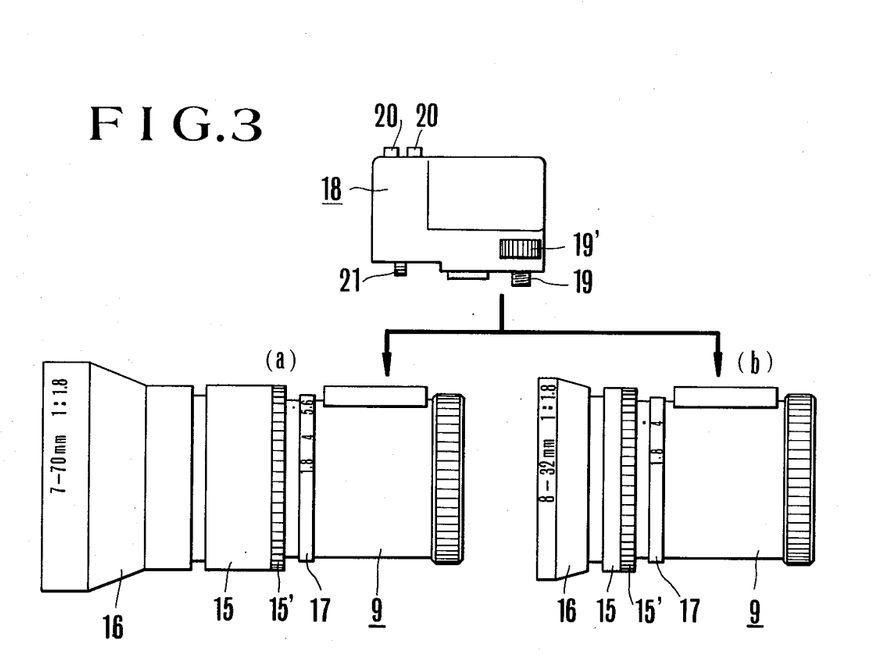
FIG. 3 is a side elevational view illustrating that a single attachment unit is selectively adaptable to either of two different type lens mount casings.

In the camera system of the present invention described above, it is possible for the motor 23 to drive the zoom control ring 15 for zooming purposes without the necessity of providing any additional electric power source in the attachment unit, because the necessary electric connection between the motor 23 in the attachment unit 18 and the power source 5 in the camera housing 1 is automatically resulted when the lens unit 9 carrying an attachment unit mounted thereon at the coupling 13 is fixedly secured on the camera housing at their mating couplings 2 and 8 by bringing the coupling 8 into engagement with the coupling 2 and turning either the lens unit 9 or the camera housing 1 with reference to the other about the optical axis thereof to offset the couplings 2 and 8 from each other, thereby the connecting terminals 10 and 10' of the stationary casing are brought into contact with the terminals 3 and 3' of the camera housing, so that the power source 5 provided for driving the camera mechanism in the camera housing is connected to the motor 23 through the connecting terminals 3, 3', 10 and 10' the wires 11 and 11' and the connecting terminals 12, 12', 28 and 28'. Besides the zoom control ring 15, there are provided a focusing ring 16 and a diaphragm control ring 17 in the mechanical mounting for the zoom lens. In the drawings, each of the couplings 8 and 13 is illustrated as provided with two connecting terminals for convenience of illustration. One of the two terminals may be earthed. Further, the terminals may be otherwise used for transmitting information representative of exposure control parameters, for example. For the purpose of transmitting additional informations, it is preferred to provide additional terminals to make more efficient the camera system of the present invention. Instead of using an auto-zoom unit as the attachment unit as illustrated in FIGS. 1 and 2, it is possible to use various attachment units having couplings of the same design. The mounting of the auto-zoom unit 18 on the lens unit 9 at the coupling 13, with the screw fastener 19 being rigidly engaged in the screw hole 14, results in the engagement of the lens unit side terminals 12 and 12' to the attachment unit side terminals 28 and 28' as well as in the engagement of the drive gear 21 with the gear 15' of the zoom control ring 15. The auto-zoom unit 18 thus mounted on the lens unit 9 may be operated with the motion picture camera equipped with the zoom lens as if they were constructed as a unit without any external electric connection wires between the auto-zoom unit and the camera housing. If the operator desires to otherwise use the camera, the auto-zoom unit may be demounted from the lens unit. The same auto-zoom unit may be mounted on another lens unit. This is depicted in FIG. 3, wherein a single auto-zoom unit is adapted for selective connection to either of two different type lens units (a) and (b). In FIG. 3, the same numerals as those shown in FIGS. 1 and 2 are employed to denote the same parts.

It will be appreciated from the foregoing description that the provision of connecting terminals connected through insulated wires buried in the stationary casing of a mechanical mounting for interchangeable lens system to connecting terminals arranged in the coupling engaging the camera housing on a portion of the outer peripheral surface of the stationary casing for effecting an electric connection between the motor in the attachment unit mounted on the casing and the power source in the camera housing is very advantageous in interchanging the lens system and managing the camera equipped with the lens system. In other words, the necessary electric connection between the camera housing and the lens unit can be automatically effected by only the mounting operation between the camera housing and the lens unit without using any externally arranged insulated wires. Also the necessary electric connection between the lens unit and the attachment unit can be automatically resulted when the attachment unit is mounted on the lens unit. As a result, the electric circuit and the power source provided in the camera housing is connected to the motor in the attachment unit through the electric connection facilities provided in the stationary casing and without the necessity of using any externally arranged wires.

Figure 4:
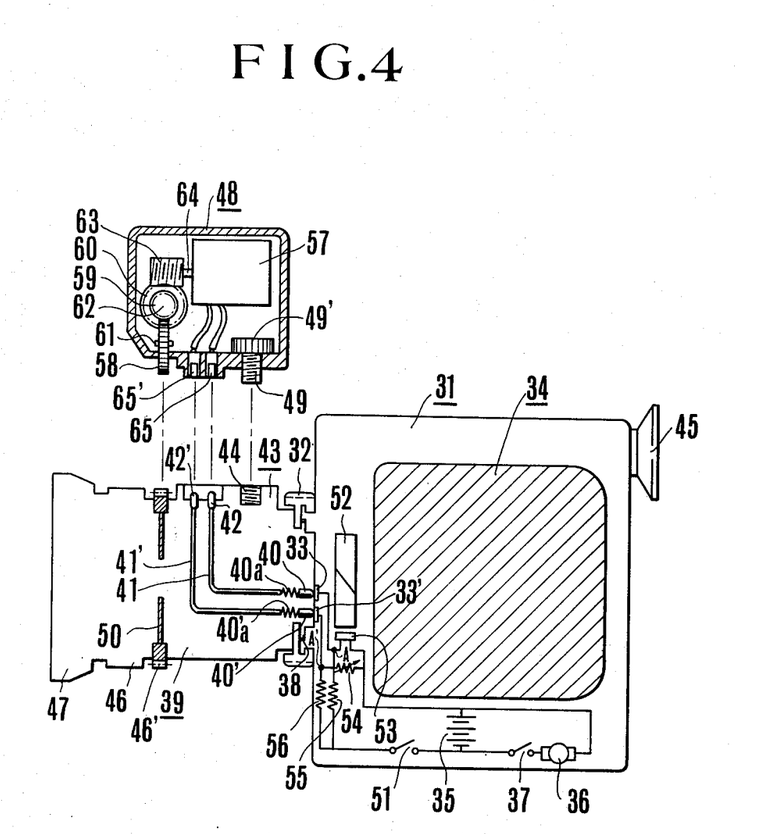
FIG. 4 is a schematic partly sectional partly elevational view of a second camera system according to the invention wherein an interchangeable lens mount casing 39 is mounted on a camera housing 31 and an interchangeable attachment unit 48 is about to be mounted on the lens mount casing 39.

FIG. 4 shows a second camera system of the present invention comprising a motion picture camera housing 31, an interchangeable lens unit 39 and an interchangeable attachment unit 48. The lens unit 39 comprises a stationary casing of a mechanical mounting for lens system, a diaphragm device associated with the mechanical mounting to control the intensity of light passing through the lens system. The attachment unit 48 is provided with a diaphragm drive mechanism for driving the diaphragm device 40 arranged therein for engagement with a gear 46' fixedly carried on a diaphragm control ring 46 of the mechanical mounting for the lens system. The motion picture camera housing 31 is provided with a coupling 32 fixedly mounted thereon, a magazine chamber which removably accommodates a film magazine 34, a battery 35 as an electric power source, a motor 36 associated with the camera mechanism including a shutter mechanism and a film transport mechanism for advancing the film in the film magazine 34 intermittantly past an exposure aperture not shown, a release switch 37 which is accessible to the operator from the outside of the camera housing 31, an eyepiece 45 provided in a view finder not shown, a beam splitter 52 arranged in the path of light from the object passing through the lens system in the lens unit 39 so that the light beam is splitted into two parts which are directed to the exposure aperture and a photoconductive element 53 having a property of converting the object brightness into an electric signal of the level dependent upon the brightness level, a variable resistor 54 of which the resistance value is adjustable in accordance with the sensitivity of the associated film in the film magazine 34 and fixed resistors 55 and 56. The photoconductive element 53, variable resistor 54 and fixed resistors 55 and 56 constitute a Wheatstone bridge circuit as a sensor circuit. The bridge circuit is connected to the battery 35 through a switch 51 which may be operated from the outside of the camera housing 31 independently of, or in automatic response to the operation of the release switch 37. A pair of connecting terminals 33 and 33' for electric connection to the lens unit 39 connected to the output terminals A and A' of the bridge circuit are provided in a space within the coupling 32. The stationary casing is provided with a coupling 38 adapted to mate with the lens unit-coupling 32 of the camera housing 31 so that the lens unit 39 is selectively mountable on the camera housing in their mating couplings 32 and 38 in bayonet-coupling relation and is selectively demountable therefrom, and fixedly mounted on the rear end of the stationary casing so that when the lens unit 39 is mounted on the camera housing at their mating couplings 2 and 8, an optical axis of the lens system in the lens unit 39 is brought into alignment with an exposure aperture in the camera housing 31. Arranged in a space within the coupling 38 is a pair of connecting terminals 40 and 40' for electric connection to the camera housing 31 which terminals are brought into electric contact with the respective camera housing side connecting terminals 33 and 33' in 33-to-40 and 33'-to-40' relations when the lens unit 39 is mounted on the camera housing 31. The stationary casing is further provided with an attachment unit-coupling 43 arranged on a portion of the outer peripheral surface thereof so that an interchangeable attachment unit 48 is selectively mountable on and demountable from the casing. Arranged in a space within the attachment unit-coupling 43 is a pair of connecting terminals 42 and 42' for electric connection to the attachment unit 48 which terminals are connected to the terminals 40 and 40' through respective insulated wires 41 and 41' so that an output from the sensor circuit is transmitted through the connecting terminals 33, 33', 40 and 40' and insulated wires 41 and 41' to the connecting terminals 42 and 42'. In order to insure that the lens unit side connecting terminals 40 and 40' remain in sufficient electric contact with the camera side connecting terminals 33 and 33' while the lens unit 39 is mounted on the camera housing 31, there are provided pressor helical springs 40a and 40a' mounted behind the respective connecting terminals 40 and 40'. In order to rigidly secure the attachment unit 48 to the coupling 43, there is provided a fastener assembly comprising a screw-threaded hole 44 provided in the coupling 43, a screw fastener 49 adapted for engagement with the hole 44 and having a control knob 19' coaxially mounted on one end of the screw fastener 49, the fastener assembly being arranged between the attachment unit 48 and the coupling 43 so that after the unit 48 is seated on the coupling 43, the control knob 49 is rotated in a certain direction causing the screw fastener 49 to enter the hole 44 while meshing therewith to rigidly secure the unit 48 to the lens unit 49. For demounting the unit 48 from the lens unit 39, the operator needs only to rotate the control knob 49 in the direction opposite to the above until the screw fastener 49 is disengaged from the hole 44. In the second camera system shown in FIG. 4, the attachment unit 48 is illustrated as being a diaphragm drive unit provided with a gear arrangement for transmitting the motion of the motor 57 to the diaphragm control ring 46 comprising a worm 63 coaxially affixed to the drive shaft 64 of the motor 57, a worm wheel 60 engaging the worm 63, a worm 59 coaxially affixed to the worm wheel 60 at a common shaft 62, and a worm wheel 58 affixed to a rotatable shaft 61 and engaging the worm 59. The worm wheel 58 is arranged to engage the gear 46' fixedly carried on the diaphragm control ring 46 when the diaphragm drive unit 48 is mounted on the lens unit 39 at the coupling 43. The unit 48 is further provided with a pair of connecting terminals 65 and 65' for electric connection to the lens unit 39 arranged so that when the unit 48 is mounted on the lens unit 39 at the coupling 43, they are brought into engagement with the lens unit side connecting terminals 42 and 42' to transmit an output from the sensor circuit in the camera housing 31 to the drive motor 57 in the diaphragm drive unit 48.

Now, the interchangeable lens unit 39 is brought into engagement with the camera housing 31 at their couplings 32 and 38, and then the coupling 32 is turned to rigidly secure the lens unit 39 to the camera housing 31, thereupon the lens unit side connecting terminals 40 and 40' being brought into electric contact with the camera side connecting terminals 33 and 33', so that an output from the output terminals A and A' of the sensor circuit in the camera housing is transmitted to the connecting terminals 42 and 42' through the connecting terminals 33, 33', 40 and 40' and the wires 41 and 41'.

In FIG. 4, the diaphragm drive unit is illustrated as an example of the interchangeable attachment unit. But it is possible to use various interchangeable units having couplings of the same design in combination with the lens unit. The mounting of the attachment unit 48 on the lens unit 39 at the coupling 38, with the screw fastener 49 being rigidly engaged in the screw hole 44, results in the engagement of the lens unit side terminals 42 and 42' with the attachment unit side connecting terminals 65 and 65' and simultaneously in the engagement of the drive gear 61 with the gear 46' of the diaphragm control ring 46 of the mechanical mounting for the interchangeable lens system. The diaphragm drive unit 48 thus mounted on the lens unit 39 may be operated with the motion picture camera as a unit without any external electric connection wires between the diaphragm drive unit 48 and the camera housing 31. If the operator desires to otherwise use the camera, the unit 48 may be demounted from the lens unit 39. The same diaphragm drive unit may be used with another lens unit of the same construction as above. Therefore, there is no need to have a number of spare attachment units of the same performance.

Figure 5:
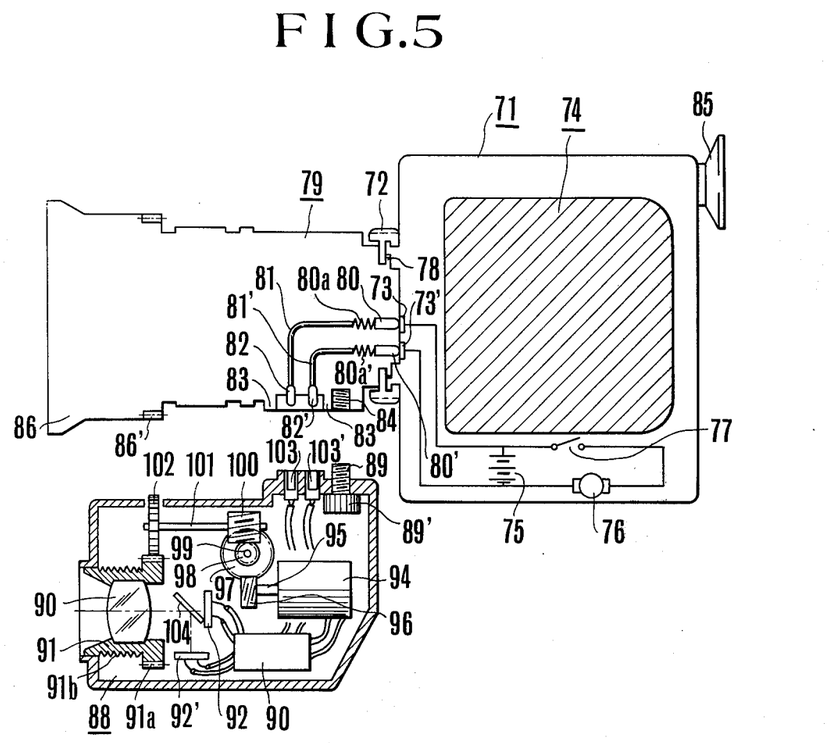
FIG. 5 is a schmatic, partly sectional, partly elevational view of a third camera system according to the invention wherein an interchangeable lens mount casing 79 is mounted on a camera housing 71, and an interchangeable attachment unit 88 is about to be mounted on the casing 79.

FIG. 5 shows a third camera system of the present invention comprising a motion picture camera housing 71, an interchangeable lens unit 79 and an interchangeable attachment unit 88. The attachment unit 88 is provided with an automatic focus-adjusting mechanism arranged therein upon detection of the camera-to-object distance to adjust the angular position of the focusing ring 86, so that an object image with light entering through the lens system in the lens unit 79 is focused on the film plane in the camera housing. The camera housing 71 is provided with a lens unit-coupling 72, a pair of connecting terminals 73 and 73' for electric connection to the lens unit 79, a magazine chamber which removably accommodates a film magazine 74, a battery 75 as an electric power source, a motor 76 associated with the camera mechanism including a shutter mechanism and a film transport mechanism for advancing the film in the film magazine 74 intermittantly past an exposure aperture not shown, a release switch 77 which is accessible to the operator from the outside of the camera housing 71, and an eyepiece 85 provided in a view finder not shown. The connecting terminals 73 and 73' are arranged in a space within the lens unit-coupling 72 of the camera housing 71 and are electrically connected to the battery 75. The lens unit 9 comprises a stationary casing of a mechanical mounting for the lens system, the stationary casing being provided with a coupling 78 adapted to mate with the lens unit-coupling 72 of the camera housing 71 so that the lens unit 79 is selectively mountable on the camera housing in their mating couplings 72 and 78 in bayonet-coupling relation and is selectively demountable therefrom, and fixedly mounted on the rear end of the stationary casing so that when the lens unit 9 is mounted on the camera housing 71 at their mating couplings 72 and 78, an optical axis of the lens sytem in the unit 79 is brought into alignment with an exposure aperture in the camera housing 71. Arranged in a space within the coupling 78 is a pair of connecting terminals 80 and 80' for electric connection to the camera housing 71 which terminals are brought into electric contact with the respective camera side connecting terminals 73 and 73' in 73-to-80 and 73'-to-80' relations when the lens unit 79 is mounted on the camera housing 71. The stationary casing is further provided with an attachment unit-coupling 83 arranged on a portion of the outer peripheral surface thereof so that an interchangeable attachment unit is selectively mountable on and demountable from the casing. Arranged in a space within the attachment unit-coupling 83 is a pair of connecting terminals 82 and 82' for electric connection to the attachment unit 78 which terminals are connected to the terminals 80 and 80' through respective insulated wires 81 and 81' to the connecting terminals 82 and 82'. In order to insure that the lens side connecting terminals 80 and 80' remain in sufficient electric contact with the camera side connecting terminals 73 and 73' while the lens unit 79 is mounted on the camera housing 71, there are provided pressor helical spring 80a and 80a' mounted behind the respective connecting terminals 80 and 80'. In order to rigidly secure the attachment unit 78 to the coupling 73, there is provided a fastener assembly comprising a screw-threaded hole 84 provided in the coupling 83, a screw fastener 89 adapted for engagement with the hole 84 and having a control knob 89' coaxially mounted on one end of the screw fastener 89, the fastener assembly being arranged between the attachment unit 88 and the coupling 83 so that after the unit 88 is seated on the coupling 83, the control knob 89 is rotated in a certain direction causing the screw fastener 89 to enter the hole 84 while meshing therewith to rigidly secure the unit 88 to the lens unit 79. For demounting the unit 88 from the lens unit 79, the operator needs only to rotate the control knob 89 in the direction opposite to the above until the screw fastener 89 is disengaged from the hole 84. An automatic focus adjusting unit 88 illustrated in FIG. 5 as an example of the interchangeable attachment unit is provided with an image-forming optical system 90 for detecting the camera-to-object distance, and a support member supporting said image-forming optical system 90, said support member being provided with an externally screw-threaded portion 91a and a gear 91b fixedly mounted thereon and engaging a gear 102 constituting part of a motion transmitting gear arrangement. The gear arrangement comprises the gear 102 affixed to a rotatable shaft 101, a helical gear 100 affixed to the shaft 101 and engaging another helical gear 99 affixed to a rotatable shaft 98, a worm wheel 97 affixed to the shaft 99 and engaging a worm 96 affixed to the drive shaft 95 of a motor 94. The gear 102 is arranged to engage the gear 86' fixedly carried on the focusing ring 86 when the automatic focus adjusting unit 88 is mounted on the lens unit 79 at the coupling 83. As the motor 94 is rotated the motion of the motor 94 is transmitted though the gear arrangement to both the focusing ring 86 and the support 91, causing the image-forming optical system 90 to move along the its optical axis, thereby the sharpnesses of the object images formed on photocell elements 92 and 92' arranged in the optical axis of the system 90 in spaced apart relation are varied to produce outputs of levels dependent upon the image sharpnesses. For facilitating such an arrangement of the photocell elements, there is provided a half mirror 104 arranged in the optical axis of the system 90 to deflect part of the light entering through the optical system 90 to the photocell element 92'. In this case, the two photocell elements 92 and 92' are spaced part from the half mirror in different distances, it being made possible to detect whether the focal point is in front of, or in rear of the film plane. The levels of the outputs from the photocell elements 92 and 93' are compared with a reference level in a control circuit thereto to control the motor 94 electrically connected to the control circuit in accordance with the difference between the levels as compared thereby. The unit 88 is further provided with a pair of connecting terminals 103 and 103' for electric connection to the lens unit 79 arranged so that when the unit 88 is mounted on the lens unit 79 at the coupling 83, they are brought into engagement with the lens unit side connecting terminals 82 and 82' to transmit an electric power supply from the battery 75 in the camera housing to the motor 94 in the attachment unit 88.

Now, the interchangeable lens unit 79 is brought into engagement with the camera housing 71 at their couplings 72 and 78, and then the coupling 72 is turned to rigidly secure the lens unit 79 to the camera housing 71, thereupon the lens unit side connecting terminals 80 and 80' being brought into electric contact with the camera side connecting terminals 73 and 73', so that an electric power supply from the battery 75 provided for driving the mechanism in the camera housing can be transmitted to the connecting terminals 82 and 82' through the connecting terminals 73, 73', 80 and 80' and the wires 81 and 81', being utilized to drive the focus adjusting mechanism in the unit 88. When the motion picture camera equipped with the lens unit 79 and the automatic focus adjusting unit 88 is aligned with an object to be photographed, an object image with light passing through the optical system 90 is formed on the surfaces of the two photocell elements 92 and 92' to produce electric outputs in accordance with the image sharpnesses, and the outputs are directed to the control circuit 93 in which they are compared to control the motor 94 in accordance with the difference between the levels as compared thereby. The controlled motion of the motor 94 is transmitted through the gear arrangement 95, 97, 98 and 100 to the gear 102, and the motion of the gear 102 is transmitted to both the support member 91 and the focusing ring 86. As the support 91 and focusing ring 86 are rotated, the image-forming optical system 90 in the support member 91 and the focusing lens member in the lens unit 79 are caused to move along their respective optical axes until a predetermined relationship between the outputs from the photocell elements 92 and 92' is established to terminate the duration of production of the output from the control circuit 93. The movement of the focusing ring 86 is related to the movement of the optical system 90 in such manner that when the predetermined relationship is established a correct focusing of an object image is effected at the film plane. As mentioned above, the automatic focus adjusting unit 88 thus mounted on the lens unit 79 may be operated with the motion picture camera as a unit without any external electric connection wires between the attachment unit 88 and the camera housing 71. If the operator desires to otherwise use the camera, the automatic focus adjusting unit may be demounted from the lens unit 79. The same automatic focus adjusting unit 88 may be mounted on another lens unit having the same structure casing.

It will be appreciated from the foregoing description that the provision of connecting terminals connected through insulated wires buried in the stationary casing of a mechanical mounting for interchangeable lens system to connecting terminals arranged in the coupling engaging the camera housing on a portion of the outer peripheral surface of the stationary casing for effecting an electric connection between the motor in the attachment unit mounted on the casing and the power source in the camera housing is very advantageous in interchanging the lens system and managing the camera equipped with the lens and attachment units. In other words, the necessary electric connection between the camera housing and the lens unit can be automatically effected with only the mounting operation between the camera housing and the lens unit without using any externally arranged insulated wires. Also the necessary electric connection between the lens unit and the attachment unit can be automatically resulted when the attachment unit is mounted on the lens unit. As a result, the electric circuit and the power source provided in the camera housing is connected to the motor in the attachment unit through the electric connection facilities provided in the stationary casing readily and without the necessity of using any externally arranged wires.

The embodiment of the present invention has been described in connection with motion picture cameras. The present invention, however, is not confined thereto, and, of cource, involves still cameras in the appended claims.

What is claimed is:

1. In a camera system having a camera body unit with mounting-demounting means which is disposed on the camera body unit for mounting and demounting a lens unit, electric signal output means for providing electrical signals and camera electrical signal interconnecting means having one end electrically connected to said output means and the other end electrically connected to said mounting-demounting means, and an interchangeable lens unit which is selectively attachable to and detachable from said mounting-demounting means on the camera body unit, said lens unit comprising:

photographing optical means forming images;

a housing for carrying said optical means, apertures being provided at both ends of the optical means along the direction of the optical axis;

mounting-demounting means disposed at least at one end of the lens unit housing to engage with and disengage from the mounting-demounting means disposed on the camera body unit for mounting the lens unit on the camera body unit; and lens unit electric signal interconnecting means provided inside the lens unit housing having one end being arranged for pressable contact with the electric signal interconnecting means provided in the camera body unit, when the two mounting-demounting means respectively provided on the camera body unit and the lens unit are mated with each other, said lens unit electrical signal interconnecting means having the other end being disposed to appear on an outside wall surface of the lens unit housing, said electric signal interconnecting means of the lens unit being provided with terminal pressing means for pressing at least one of the ends of the lens unit electric signal interconnecting means outwardly of the lens unit housing for bringing said end into contact with the electric signal camera interconnecting means, and wherein the electrical output of the output means in the camera body unit is passed by the camera interconnecting electric signal means and is arranged to be provided external to the lens unit by way of the lens unit electric signal interconnecting means.

2. An interchangeable lens unit as defined in claim 1 wherein said lens unit electric signal interconnecting means includes electric wire made from a conductive material, and terminals electrically disposed at both ends of said electric wire respectively.

3. An interchangeable lens unit as defined in claim 1 wherein said mounting-demounting means disposed on the lens unit housing possesses a bayonet connection part which mates with another bayonet part provided on the camera body unit.

4. An interchangeable lens unit as defined in claim 1 wherein said photographing optical means includes at least a focusing lens and a zooming lens.

5. An interchangeable lens unit as defined in claim 1 wherein said photographing optical means includes means for moving at least a part of said focusing lens on the optical axis.

6. An interchangeable lens unit as defined in claim 4 wherein said photographing optical means includes means for moving at least a part of said zooming lens on the optical axis.

7. An interchangeable lens unit wherein there are provided a photographing optical means capable of forming images and a controlling means capable of controlling the state of the image which is formed in a preset position through said optical means, said lens unit for cooperation with an operating unit which includes operating means provided for selective connection to said controlling means through a mechanical link and arranged to be actuated by an electric signal coming from outside of the operating unit and which has mounting-demounting means disposed thereon, said operating unit being selectively attachable to and detachable from the lens unit, the lens unit also for cooperation with and selectively attachable to and detachable from a camera body unit, said camera having mounting-demounting means thereon with one end including supplying means for supplying an electric signal, the interchangeable lens unit comprising:
a housing for carrying said photographing optical means and said controlling means, being provided at both ends of the optical means in the direction of the optical axis thereof, a first mounting-demounting means disposed at at one end of said housing to engage with and disengage from a corresponding mounting-demounting means of said camera body unit for mounting the housing on the camera body unit;
a second mounting-demounting means disposed on an outside wall surface of said housing for permitting mounting said operating unit on the housing;
electric signal interconnecting means provided inside said housing with one end thereof being arranged for pressable contact with signal supplying means in said camera when said first mounting-demounting means on the lens unit is mated with the mounting-demounting means of said camera and with the other end being disposed in the second mounting-demounting means, and wherein the electric signal from said supplying means in the camera body unit is provided through said electric signal interconnecting means to said operating unit when the lens unit is mounted on the camera body unit and the operating unit is attached to the lens unit.

8. An interchangeable lens unit as defined in claim 7 wherein said electric signal interconnecting means includes electric wire made from a conductive material, and terminals electrically disposed at both ends of said electric wire respectively.

9. An interchangeable lens unit as defined in claim 7 wherein terminal pressing means is provided on said electric signal interconnecting means at least at one end thereof for contacting said signal supplying means in said camera in such a manner as to resiliently press the end of said interconnecting means toward the outside of said housing.

10. An interchangeable lens unit as defined in claim 7 wherein said first mounting-demounting means is provided with a bayonet connection part which mates with another bayonet part provided on the camera body unit.

11. An interchangeable lens unit as defined in claim 7 wherein said second mounting-demounting means is provided with a recess arranged to mate with a protrusion provided on said mounting-demounting means of said operating unit with one end of said electric signal interconnecting means disposed in said recess.

12. An improvement in a camera system comprising a camera body unit, a lens unit and an operating unit, said camera body unit including:
a camera body housing with an aperture provided in the front part thereof;
mounting-demounting means disposed on the camera body housing adjacent to said aperture for allowing a lens unit to engage with and disengage from the housing with the optical axis of said lens unit in alignment with said aperture;
image recording means disposed inside the camera body housing for recording an incident image entering through the aperture on a film disposed in the camera body housing;
an electric power source disposed in the camera body housing for supplying electric power for driving at least a part of said image recording means; and
electric interconnecting means disposed in the camera body housing having one end electrically connected to said electric power source and the other end positioned in said mounting-demounting means;
said lens unit including:
a photographic optical system for forming images in said image recording means;
a lens housing for carrying said photographic optical system having apertures provided at both ends of the optical system in the direction of the optical axis;
first mounting-demounting means disposed at least at one end of the lens housing to selectively engage with and disengage from said mounting-demounting means of the camera body unit;
controlling means disposed in the lens housing to control the state of the incident image which enters said image recording means through said photographic optical system;

second mounting-demounting means disposed on the outside wall surface of the lens housing to engage with and disengage from the operating unit for operating the controlling means from outside of the lens unit; and electric interconnecting means disposed inside the lens housing with one end thereof disposed in a position to be brought into pressed contact with the electric interconnecting means provided in the camera body unit when the mounting-demounting means of the camera body unit mates with that of the lens unit while the other end is positioned in the second mounting-demounting means;

said operating unit including:

an operating unit housing;

operating means disposed inside the operating unit housing to be actuated by an electric signal for operating said controlling means in said lens unit, a part of said operating means arranged to engage with said controlling means through a mechanical link;

mounting-demounting means provided on the outside wall surface of the operating unit housing to engage with and disengage from the second mounting-demounting means of the lens unit for mounting and demounting the operating unit on and off the lens unit; and electric interconnecting means disposed inside the operating unit housing having one end thereof disposed to be brought into pressed contact with the electric interconnecting means provided in the lens unit when the mounting-demounting means of the operating unit mates with that of the lens unit, the other end being electrically connected to the operating means;

said camera body unit, said lens unit and said operating unit being interchangeable respectively to provide for optional combinations of different types of units, and said operating means being arranged to be actuated by the output of the electric power source disposed inside the camera body housing.

13. A camera system as defined in claim 12 wherein said mounting-demounting means of the camera body unit and the first mounting-demounting means of the lens unit being each provided with bayonet coupling part respectively, one bayonet part arranged to be selectively mated with the other bayonet part.

14. A camera system as defined in claim 12 wherein said controlling means is provided with a diaphragm member for controlling therewith the quantity of light of a photographic object passing through said photographic optical system.

15. A camera system as defined in claim 14 wherein the electric interconnecting means provided in the camera body unit includes:

light quantity detecting means for detecting the quantity of light of an object being photographed passing through said photographic optical system, the input side of said light quantity detecting means being electrically connected to said electric power source; and electric conductor wire made of a conductive material having one end thereof electrically connected to the output end of said light quantity detecting means and the other end thereof being disposed in the mounting-demounting means of the camera body unit.

16. A camera system as defined in claim 15 wherein the operating means includes driving means which operates in accordance with the output of said light quantity detecting means.

17. A camera system as defined in claim 12 wherein said photographic optical system is provided with at least a zooming lens; and said controlling means is capable of controlling said lens housing for moving said zooming lens along the optical axis of the zooming lens.

18. A camera system as defined in claim 12 wherein said photographic optical system is provided with detecting means for detecting the visibility of an image formed at a preset position.

19. A camera system as defined in claim 13 wherein said electric interconnection means of the lens unit, is adapted to be placed in pressed contact with the electric interconnection means of the camera body unit, and is provided with terminal pressing means for pressing said end of the interconnection means toward the outside of said lens housing.

20. An automatic focus adjustable camera system comprising a camera body unit including:

a camera body housing with an aperture provided in the front part thereof;

mounting-demounting means disposed in said camera body unit in the vicinity of said aperture to permit selective mounting and demounting of a lens unit with the optical axis of the lens unit maintained in alignment with the aperture;

an electric power source disposed inside said camera body housing for supplying electric power required for operating the camera body unit; and electric power interconnecting means disposed inside the camera body housing with one end thereof electrically connected to said electric power source and the other end disposed in said mounting-demounting means provided on the camera body unit;

a lens unit including:

a photographic optical system for forming images at a preset position inside said camera body unit;

a lens housing for carrying said photographic optical system;

a first mounting-demounting means provided on the lens unit for engagement with and disengagement from the mounting and demounting means of the camera body unit for selective mounting of the lens unit on the camera body unit;

variating means which variates the position of said photographic optical system on its optical axis having one end thereof connected to a part of said lens housing through a mechanical link;

a second mounting-demounting means provided on the outside wall surface of said lens housing for allowing selective engagement and disengagement of a focus adjustment unit for operating said variating means from outside of the lens unit; and electric interconnecting means disposed inside the lens housing having one end disposed to be in pressed contact with the electric interconnecting means of the camera body unit when the mounting-demounting means of the camera body unit mates with that of the lens unit and the other end being disposed in the second mounting-demounting means of the lens unit; and a focus adjustment unit, including:

a focus adjustment unit housing;

a focus-adjustment image forming optical system for forming an image at a preset position inside the focus adjustment unit housing;

detecting means for detecting the state of the image formed at the preset position by said focus-adjustment image forming optical system, said detecting means being provided with driving means which controls said variating means in relation to the displacement of said focus-adjustment image forming optical system in the direction of its optical axis;

mounting-demounting means to be selectively engaged with and disengaged from the second mounting-demounting means of the lens unit for mounting and dismounting the focus adjustment unit on and off the lens unit; and electric interconnecting means disposed inside said focus adjustment unit housing with one end thereof positioned to be brought into pressed contact with the electric interconnecting means of the lens unit when the mounting-demounting means of the focus adjustment unit mates with the second mounting-demounting means of the lens unit and the other end being electrically connected to said driving means; said driving means in the focus adjustment unit thus being arranged to be actuated by the output of said electric power source of the camera body unit.

21. A camera system as defined in claim 20 wherein the mounting-demounting means of the camera body unit and the first mounting-demounting means of the lens unit are provided with bayonet coupling parts respectively with one bayonet part arranged to be selectively mated with the other bayonet part.

22. A camera system as defined in claim 21 wherein said electric interconnecting means of the lens unit, is provided with terminal pressing means for pressing said end of the interconnecting means toward the outside of the lens housing.

23. A camera system as defined in claim 20 wherein said detecting means is provided with a photoelectric conversion element.

24. In a camera system comprising a camera body unit equipped with means for permitting attaching and detaching lens units, an interchangeable lens unit which can be selectively mounted on and demounted from said camera body unit and which allows the forming of an image at a preset position, and an adjustment unit which can be selectively mounted on and demounted from said interchangeable lens unit for adjusting the state of the image formed by the lens unit, said interchangeable lens unit including:

a photographic optical system for forming said image at a preset position within said camera body unit;

a lens housing which carries said photographic optical system having apertures provided at both ends of the photographic optical system in the direction of the optical axis thereof;

a first mounting-demounting means disposed at least at one end of said lens housing for engaging with and disengaging from a mounting-demounting means arranged on the camera body to permit mounting the lens unit on and off the camera body unit;

controlling means disposed inside the lens housing for controlling the state of the incident image which enters the camera body unit passing through said photographic optical system; and a second mounting-demounting means disposed on the outside wall surface of said lens housing for allowing selective mounting and dismounting of said adjustment unit on and off the lens unit for operating said controlling means from outside of the lens unit; and said adjustment unit including:

an adjustment unit housing;

operating means which is actuated by an electric signal and in turn operates said controlling means, the operating means being disposed inside the adjustment unit housing with a part of it being arranged to be connected to said controlling means through a mechanical link;

mounting-demounting means disposed on the outside wall surface of said adjustment unit housing to permit selective engagement with and disengagement from the second mounting-demounting means of the lens unit for mounting the adjustment unit on and dismounting it from said lens unit; and electric interconnecting means provided in said adjustment unit with one end thereof disposed to be brought into pressed contact when the mounting-demounting means of the adjustment unit comes to mate with the second mounting-demounting means of the lens unit and with the other end being electrically connected to said operating means; and wherein the lens unit and the adjustment unit are respectively arranged to be interchangeable so as to permit optional combinations between different types of units.

25. A camera system as defined in claim 24 wherein said controlling means is provided with a diaphragm member for controlling the quantity of light of an object being photographed which enters passing through said photographic optical system.

26. A system as defined in claim 24 wherein said electric interconnecting means of the lens unit is provided with terminal pressing means for pressing an end toward the outside of the lens housing.

27. A system as defined in claim 24 said photographic optical system includes at least a focusing lens and a zooming lens.

* * * * *